United States Patent
Itoh et al.

[11] Patent Number: 5,952,761
[45] Date of Patent: Sep. 14, 1999

[54] INVERTER-DRIVEN MOTOR

[75] Inventors: Hiroshi Itoh; Hirokazu Yamauchi, both of Takefu, Japan

[73] Assignee: Matsushita Electric Industrial Co., Ltd., Kadoma, Japan

[21] Appl. No.: 08/887,644

[22] Filed: Jul. 3, 1997

[30] Foreign Application Priority Data

Jul. 4, 1996 [JP] Japan .................................. P8-174688

[51] Int. Cl.⁶ .............................. H02K 3/34; H01B 17/00
[52] U.S. Cl. ........................................ 310/215; 174/138 E
[58] Field of Search ............................. 310/215, 45, 213, 310/214, 216, 254, 258, 259; 336/185, 196, 221; 174/138 E, 148

[56] References Cited

FOREIGN PATENT DOCUMENTS 8-107642  4/1996  Japan .

*Primary Examiner*—Thomas M. Dougherty
*Assistant Examiner*—Dang Dinh Le
*Attorney, Agent, or Firm*—Wenderoth, Lind & Ponack, L.L.P.

[57] ABSTRACT

An inverter-driven motor which is driven by an inverter power source and includes an insulating member for insulating a winding wire and an iron core of the inverter-driven motor from each other at a groove. The insulating member is formed by not less than two insulating films and at least one of the insulating films is formed with a plurality of bores.

4 Claims, 10 Drawing Sheets

Leakage current

INVERTER-DRIVEN MOTOR

BACKGROUND OF THE INVENTION

The present invention generally relates to an inverter-driven motor for industrial use, which is driven by an inverter power source and more particularly, to an inverter-driven motor of a variable speed electric compressor which is built into an air-conditioner or the like, contains refrigerant and freezed machine oil and is driven by an inverter power source.

In recent industrial fields, a trend that motors, for example, motors for driving cutting machine tools, are driven by inverters is gaining momentum because the speed of the inverter-driven motors can be changed arbitrarily. Meanwhile, also in the field of air-conditioners, the number of air conditioning systems employing electric compressors driven by inverter power sources is on the increase. Use of the inverter power sources leads to more a comfortable air conditioning state and enables change of capabilities of the air conditioning systems, saving of energy and silent running. Demand for these features of the inverter power sources is becoming greater in the market.

However, if a motor is driven by an inverter power source, such a problem arises that quantity of leakage current is greater than that of a case in which a commercial power source is used. FIG. 11A shows wave form of output voltage of the inverter power source, while FIG. 11B shows wave form of output voltage of the commercial power source. FIG. 12A shows wave form of output current of the inverter power source, while FIG. 12B shows wave form of output current of the commercial power source. Wave form of the inverter power source contains more harmonic components than those of the commercial power source. On the other hand, an insulating film for a groove insulation in the motor has capacitance and its impedance Z is expressed by the following equation (1):

$$Z = 1/(2\pi f C) \quad (1)$$

where "f" denotes frequency and "C" denotes capacitance.

In case the inverter power source is used, the frequency f rises, so that the impedance Z decreases due to the many harmonic components as is apparent from the above equation and thus, electric current readily leaks from a winding wire to a grounded iron core via the capacitance.

FIG. 9 is explanatory of a method of measuring leakage current of an inverter-driven motor 28 of a known electric compressor 40 driven by an inverter power source 25 and having a compression mechanism 22. The inverter-driven motor 28 is built in a casing 21 of the electric compressor 40 and mixed liquid 23 of refrigerant and freezed machine oil are contained in the casing 21. In FIG. 9, voltage from the inverter power source 25 is applied to a winding wire 5 of the inverter-driven motor 28 through a terminal 24 insulated from ground. At a groove 6 for holding the winding wire 5, insulation between the winding wire 5 and an iron core 11 is performed by an insulating film 7 of several hundreds μm in thickness and a wedge type insulating film 8 having a thickness of several hundreds μm. Electric current having harmonic components leaks from the winding wire 5 to the iron core 11 grounded via capacitance and DC insulation resistance of the insulating film 7 and the wedge type insulating film 8 and is measured by a leakage current meter 27.

FIG. 10 shows an equivalent circuit of a flow path of the leakage current of FIG. 9. In FIG. 10, electrical function of the insulating film 7 in the groove 6 is divided into a capacitance 29 and a DC insulation resistance 30.

Conventionally, in order to reduce leakage current, a first method in which the diameter of the winding wire 5 is reduced and a second method in which thickness of the insulating film 7 is increased have been employed. In the first method, since the capacitance 29 of FIG. 10 is lessened by reducing diameter of the winding wire 5, harmonic components of leakage current are less likely to flow. Here, a capacitance C of a capacitor has the following relation (2):

$$C = \in S/d \quad (2)$$

where "$\in$" denotes dielectric constant, "S" denotes area of each of a pair of electrode plates of the capacitor and "d" denotes distance between the electrode plates. Assuming that "$\in_o$" denotes spatial dielectric constant and "$\in_s$" denotes relative dielectric constant, the dielectric constant $\in$ is a product of the spatial electric constant $\in_o$ and the relative dielectric constant $\in_s$, namely, $\in = \in_o \in_s$.

According to the equation (2), the capacitance C decreases as the area S of each of the electrode plates is reduced. In the inverter-driven motor 28 of FIG. 9, each of the surface area of the groove 6 and the surface area of the winding wire 5 held in the groove 6 corresponds to the area S of each of the electrode plates. Therefore, reduction of the surface area of the winding wire 5 by reducing the winding wire diameter results in reduction of the area S of each of the electrode plates of the capacitor, so that the capacitance 29 can be lessened and thus, the impedance Z increases based on the equation (1). Consequently, since harmonic components of leakage current are less likely to flow, quantity of leakage current can be reduced effectively.

However, if the surface area of the winding wire 5 is lessened by reducing the winding wire diameter, resistance value of the winding wire 5 increases, so that Joule loss of electric current increases and thus, primary copper loss of the motor increases, thereby resulting in a drop in the efficiency of the motor.

In the above mentioned second method, since the capacitance 29 of FIG. 10 is lessened by increasing thickness of the insulating film 7, harmonic components of leakage current are less likely to flow. FIG. 8 shows one example of a known insulating film 7 which is formed by insulating films 7a and 7b such that thickness of the insulating film 7 is increased.

In the equation (2), if the distance d between the electrode plates of the capacitor is increased, the capacitance C decreases. In the inverter-driven motor 28 of FIG. 9, thickness of the insulating film 7 corresponds to the distance d between the electrode plates of the capacitor. Therefore, since the capacitance 29 can be lessened by increasing thickness of the insulating film 7, harmonic components of leakage current are less likely to flow, thus resulting in reduction of quantity of leakage current.

However, if thickness of the insulating film 7 is increased, the effective area for holding the winding wire 5 in the groove 6 is reduced and thus, the whole of the winding wire 5 cannot be accommodated in the groove 6. Thus, if the diameter of the winding wire 5 is reduced so as to lessen the sectional area of the winding wire 5, the whole of the winding wire 5 can be accommodated in the groove 6. However, in this case, since resistance value of the winding wire 5 increases as described above in connection with the first method, efficiency of the motor drops undesirably.

SUMMARY OF THE INVENTION

Accordingly, in order to eliminate the above mentioned drawback of drop of efficiency in a conventional inverter-driven motor at the time of reduction of its leakage current, an essential object of the present invention is to provide an inverter-driven motor whose efficiency does not drop even if a measure for lessening its leakage current is taken.

In order to accomplish this object of the present invention, an inverter-driven motor according to the present invention is driven by an inverter power source and includes an insulating member for insulating a winding wire and an iron core of the inverter-driven motor from each other at a groove. The insulating member is formed by not less than two insulating films, and at least one of the insulating films is formed with a plurality of bores.

Capacitance of the insulating film having the bores is equivalent to that of an electric circuit in which capacitance of air layer having a relative dielectric constant of 1.0 and capacitance of an insulating film having a relative dielectric constant of more than 1.0 are connected to each other in parallel. Therefore, since capacitance of the insulating film having the bores decreases, quantity of leakage current of the inverter-driven motor can be lessened without a drop in the efficiency of the inverter-driven motor.

Furthermore, the present invention provides an inverter-driven motor which is driven by an inverter power source and is built in a vessel of an electric compressor and includes an insulating member for insulating a winding wire and an iron core of the inverter-driven motor at a groove. The insulating member is formed by not less than three insulating films, and at least one of the insulating films is formed with a plurality of bores. Two of the remaining ones of the insulating films are not formed with a bore and are provided on opposite side faces of the at least one of the insulating films, respectively.

Since the two insulating films having no bores cover the opposite side faces of the one insulating film having a plurality of bores so as to be integrally brought into close contact with the opposite side faces of the one insulating film, freezed machine oil having a relative dielectric constant of more than 1.0 and used in the electric compressor does not penetrate into the bores of the one insulating film. Therefore, for the same reason as that given for the first invention, capacitance of the one insulating film having the bores decreases and thus, quantity of leakage current of the inverter-driven motor is reduced without a drop in the inverter-driven motor.

BRIEF DESCRIPTION OF THE DRAWINGS

The object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
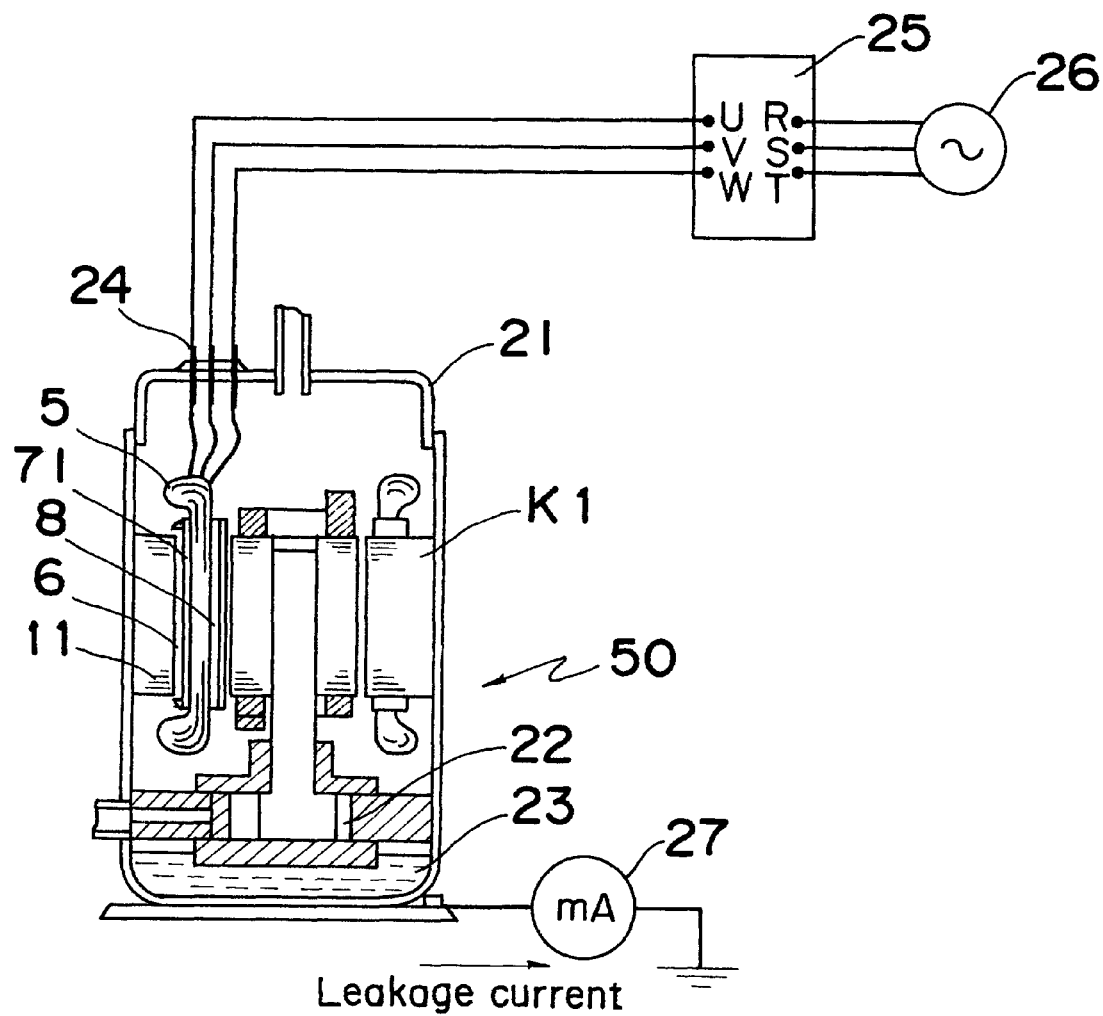
FIG. 1 is a schematic sectional view of an electric compressor incorporating an inverter-driven motor according to a first embodiment of the present invention.

FIG. 1 shows an inverter-driven motor K1 according to a first embodiment, which may be applied to an electric compressor 50 including a compression mechanism 22. The inverter-driven motor K1 is driven by an inverter power source 25 and is built in a casing 21 of the electric compressor 50. Meanwhile, mixed liquid 23 of refrigerant and freezed machine oil is contained in the casing 21.

Figure 2:
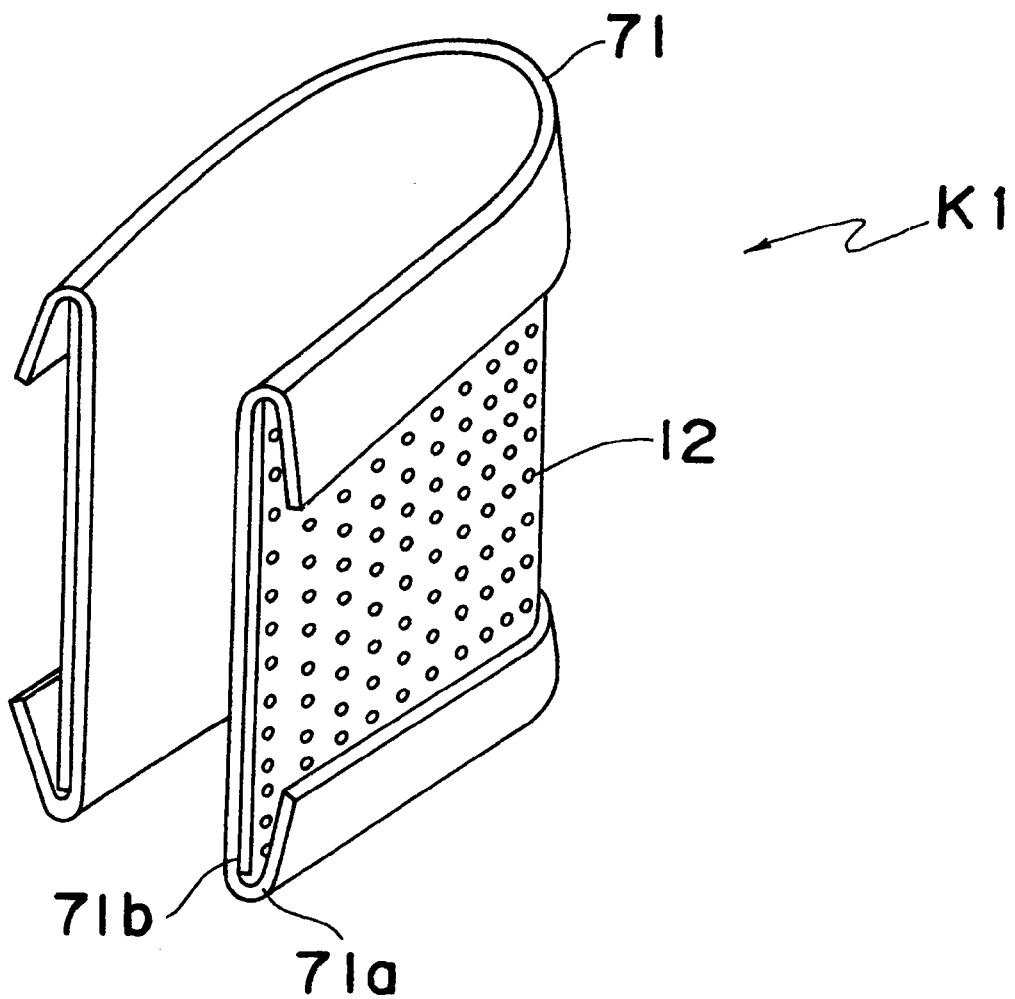
FIG. 2 is a perspective view of an insulating film of the inverter-driven motor of FIG. 1.
Figure 3:
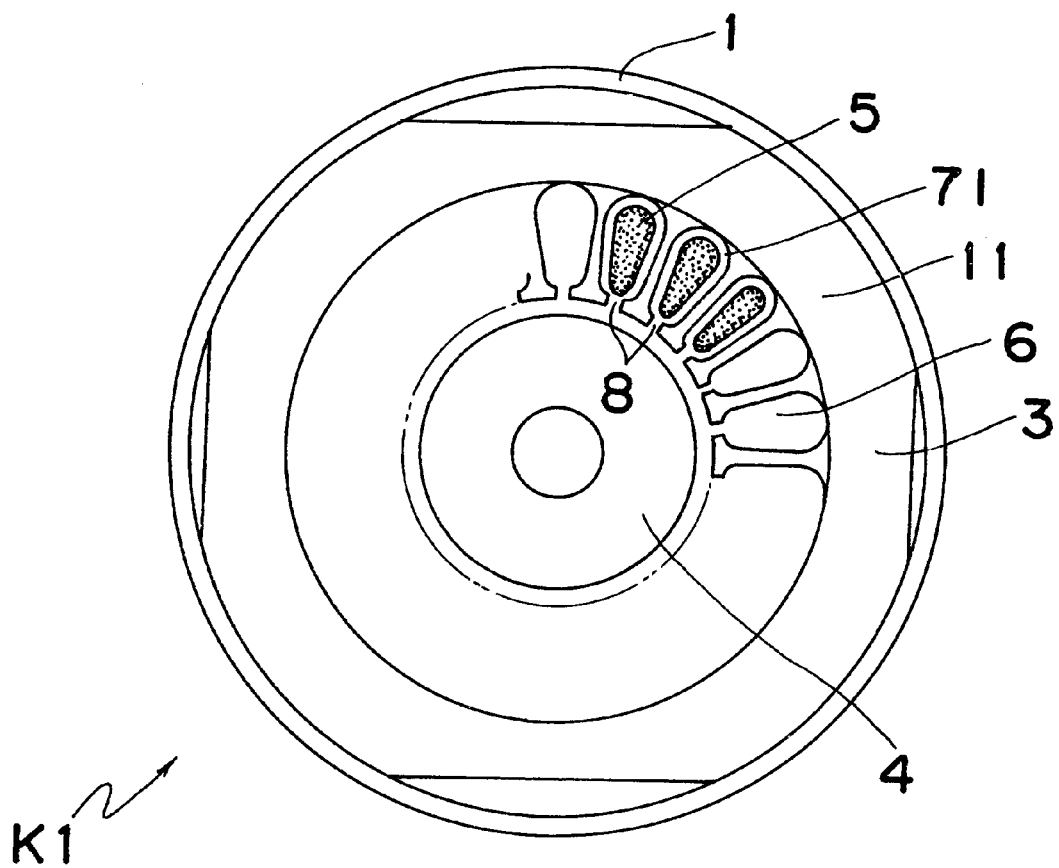
FIG. 3 is a transverse sectional view of the inverter-driven motor of FIG. 1.
Figure 4:
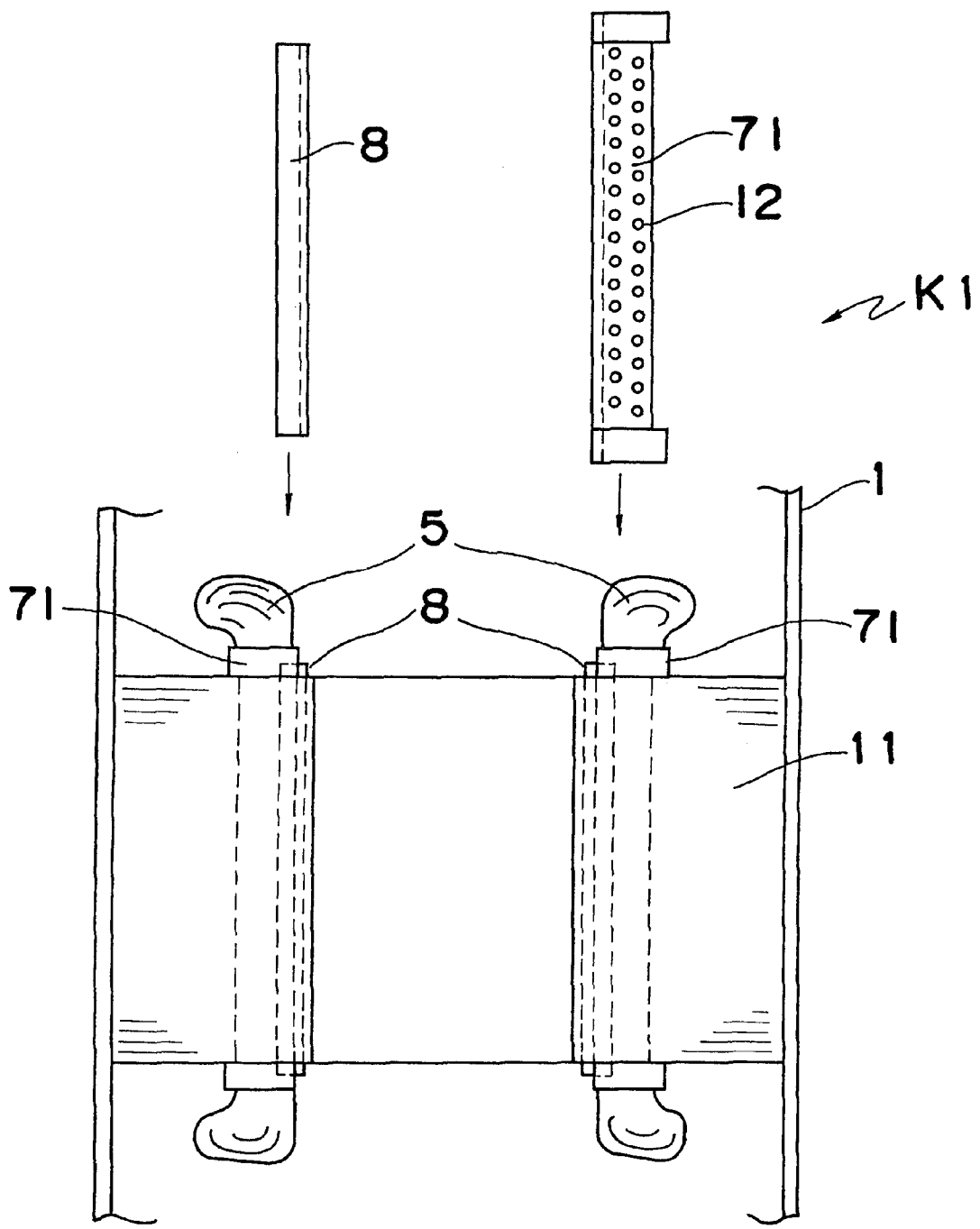
FIG. 4 is an exploded sectional view of the inverter-driven motor of FIG. 1.

As shown in FIG. 3, a plurality of axially extending grooves 6 are formed on an inner peripheral surface of a stator 3 of the inverter-driven motor K1. An insulating film 71, shown in FIG. 2, is closely fitted into each of the grooves 6 as shown in FIG. 3. Furthermore, a winding wire 5 is closely fitted onto the insulating film 71. A wedge type insulating film 8, shown in FIG. 4, is provided at a gap between opposite edges of the insulating film 71 as shown in FIG. 3. The winding wire 5 and an iron core 11 of the stator 3 are insulated from each other by the insulating film 71 and the wedge type insulating film 8.

As shown in FIG. 2, the insulating film 71 is formed by an insulating film 71a and an insulating film 71b which has a plurality of bores 12 and is gripped between opposite bent brims of the insulating film 71a.

Figure 10:
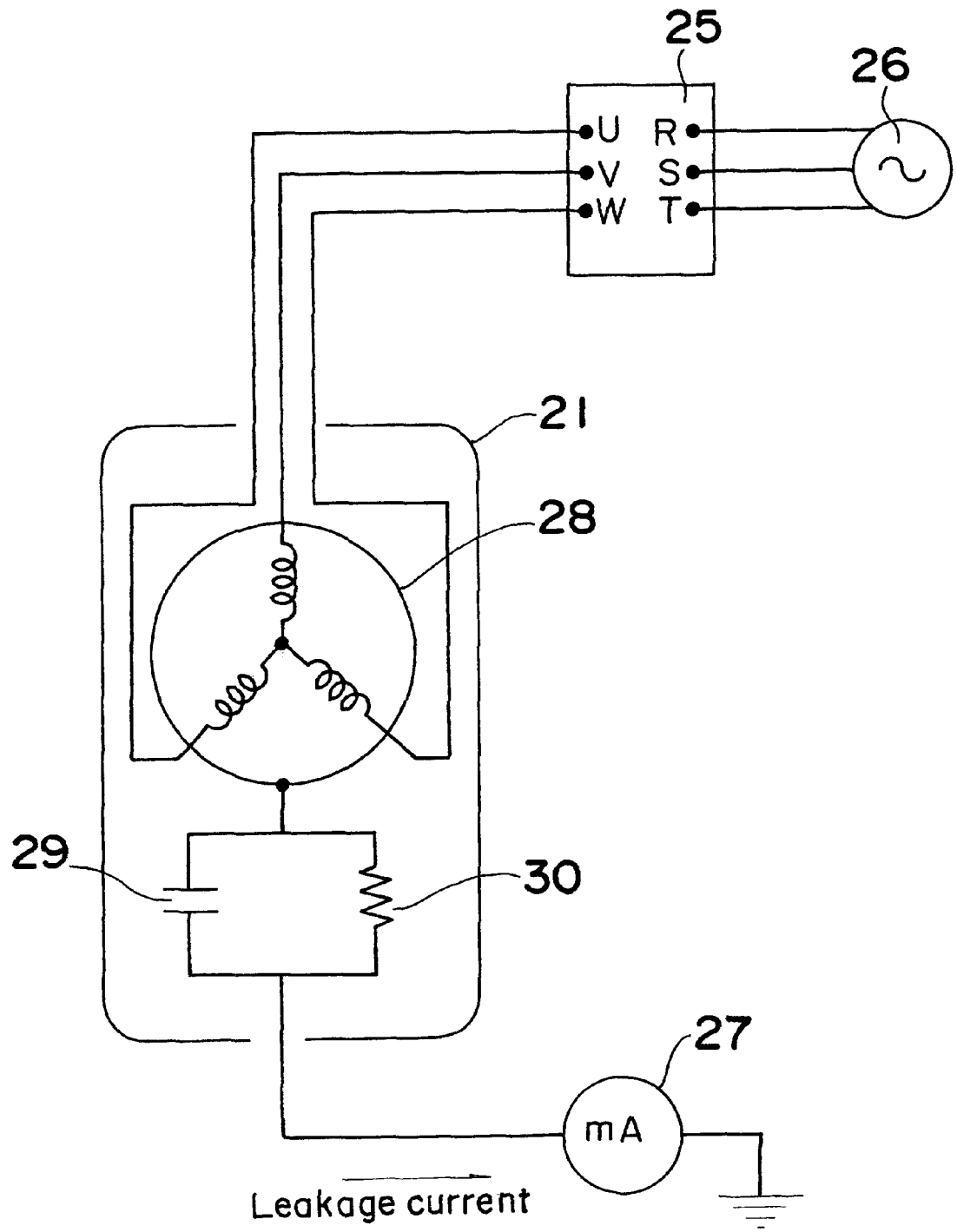
FIG. 10 is a circuit diagram showing an equivalent circuit of a flow path of the leakage current of the inverter-driven motor of FIG. 9.
Figure 11A:
FIG. 11A and 11B are diagrams showing wave forms of output voltage of a prior art inverter power source and a prior art commercial power source, respectively.
Figure 11B:
Figure 12A:
FIGS. 12A and 12B are diagrams showing wave forms of output current of the inverter power source and the commercial power source of FIGS. 11A and 11B, respectively.
Figure 12B:

If the relative dielectric constant $\in_s$ is small, capacitance C is reduced as will be seen from an equation (2) referred to earlier. Insulating film materials generally have a relative dielectric constant of about 3, while the relative dielectric constant of air is as small as 1.0. Therefore, capacitance of the bores 12 is smaller than that of the insulating film materials. Capacitance of the insulating film 71b formed with the bores 12 is equivalent to that of an electric circuit in which capacitance of an air layer and capacitance of the insulating film materials are connected to each other in parallel. Capacitance of the air layer is smaller than that of the insulating film materials as described above. Accordingly, capacitance of the insulating film 71b having the bores 12 is smaller than that of an insulating film having no bore 12. Therefore, since capacitance 29 in FIG. 10 is reduced impedance Z is increased from equation (1) referred to earlier, so that harmonic components of leakage current are less likely to flow and thus, quantity of leakage current is reduced.

Since capacitance of the insulating film 71b having the bores 12 is reduced as described above, quantity of leakage current can be reduced without the need for increasing the thickness of the insulating film 71 and reducing the diameter of the winding wire 5. Consequently, quantity of leakage current of the inverter-driven motor K1 can be reduced without a drop in the efficiency of the inverter-driven motor K1. Meanwhile, since the insulating film 71a is not formed with bores as in prior art inverter-driven motors, the insulating film 71a is capable of insulating the winding wire 5 and the iron core 11 from each other.

Figure 5:
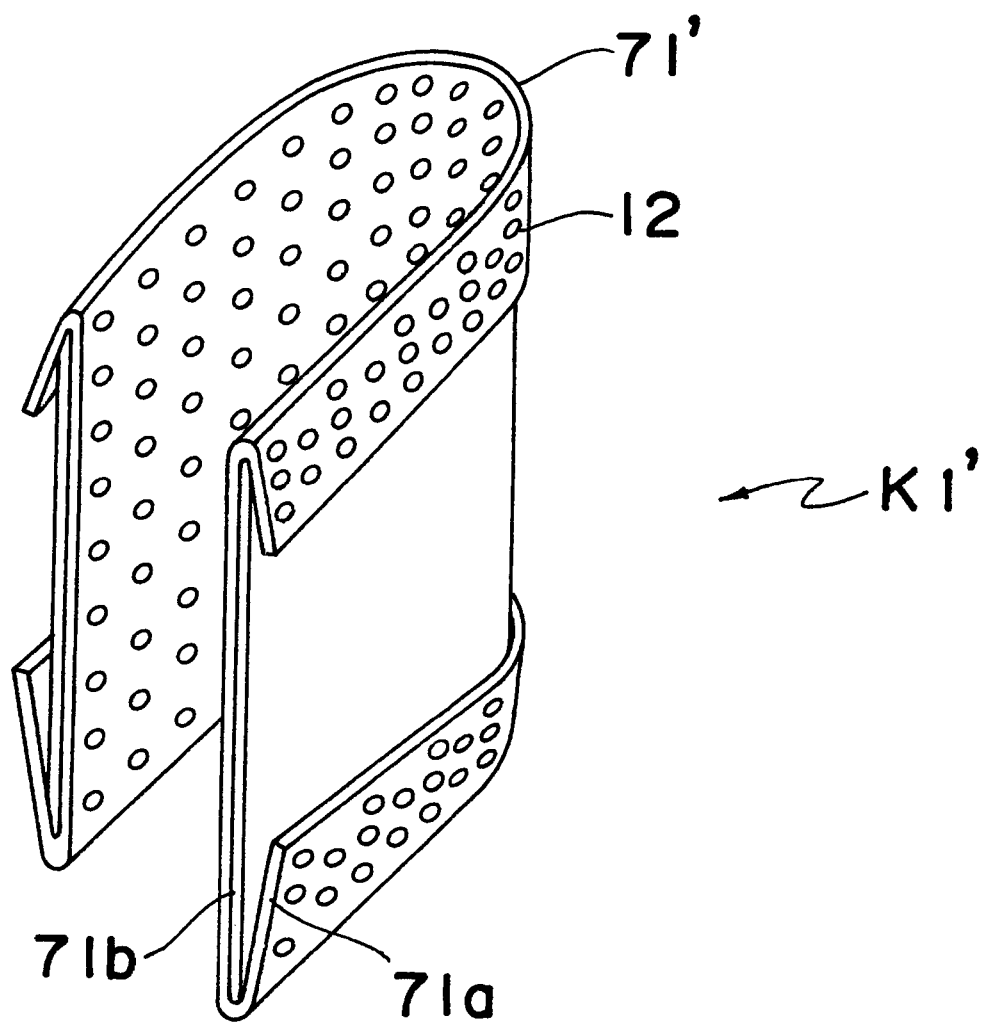
FIG. 5 is a perspective view of a modification of the insulating film of FIG. 2.

In the insulating film 71 of FIG. 2, the insulating film 71a has no bores but the insulating film 71b does has the bores 12. FIG. 5 shows an insulating film 71' of an inverter-driven motor K1' which is a modification of the inverter-driven motor K1. In the insulating film 71', the insulating film 71b has no bores but the insulating film 71a has the bores 12. In the inverter-driven motor K1', the same effects as those of the inverter-driven motor K1 can be, needless to say, obtained.

Figure 6:
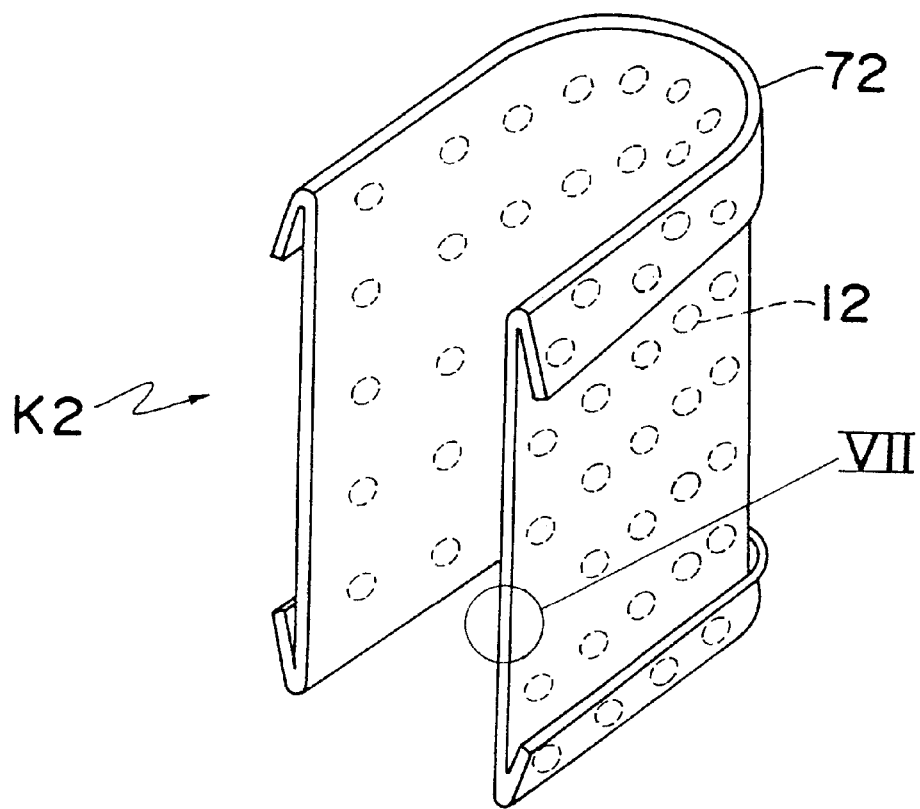
FIG. 6 is a perspective view of an insulating film of an inverter-driven motor according to a second embodiment of the present invention.
Figure 7:
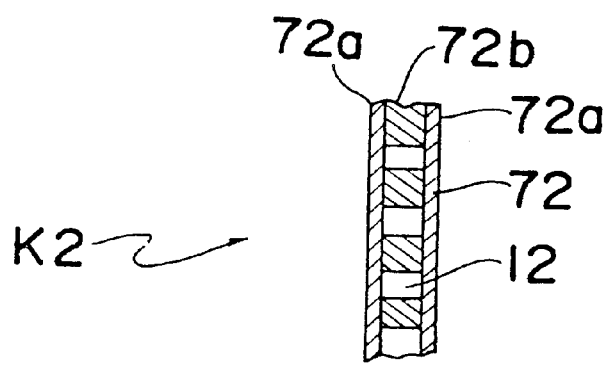
FIG. 7 is an enlarged sectional view of a portion VII in FIG. 6.
Figure 8:
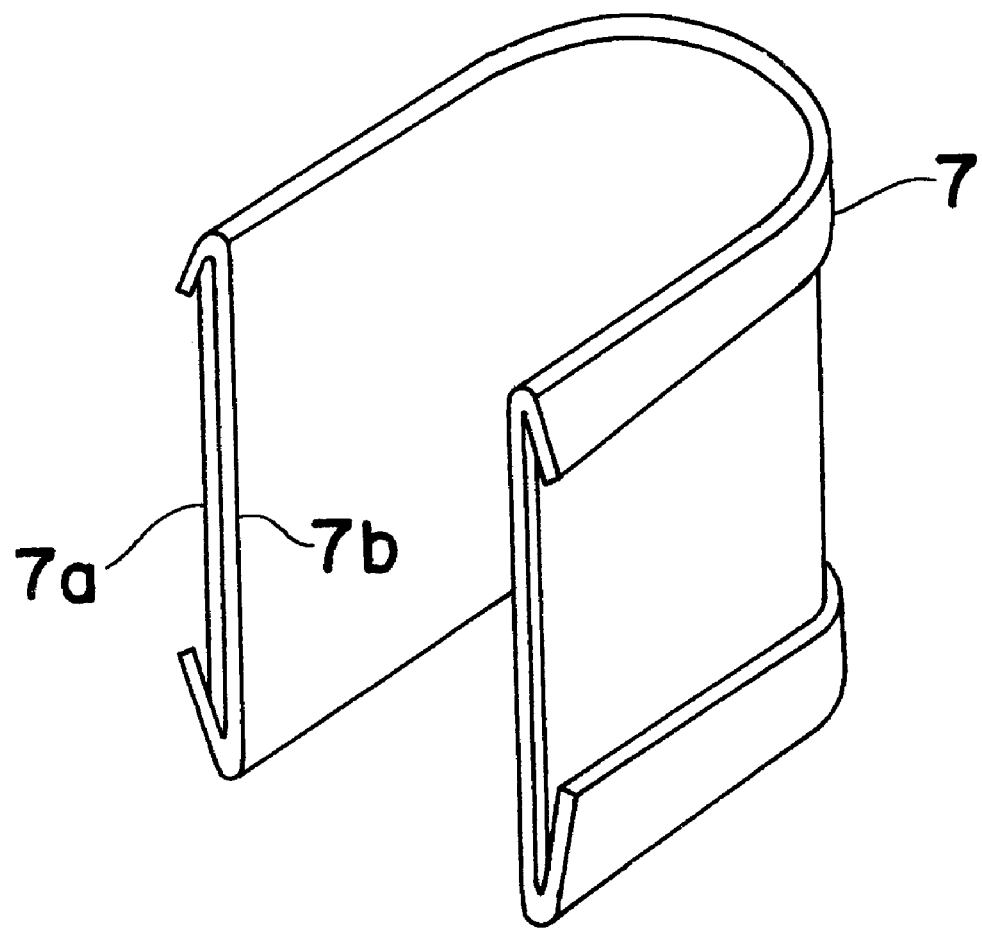
FIG. 8 is a perspective view of a prior art insulating film.
Figure 9:
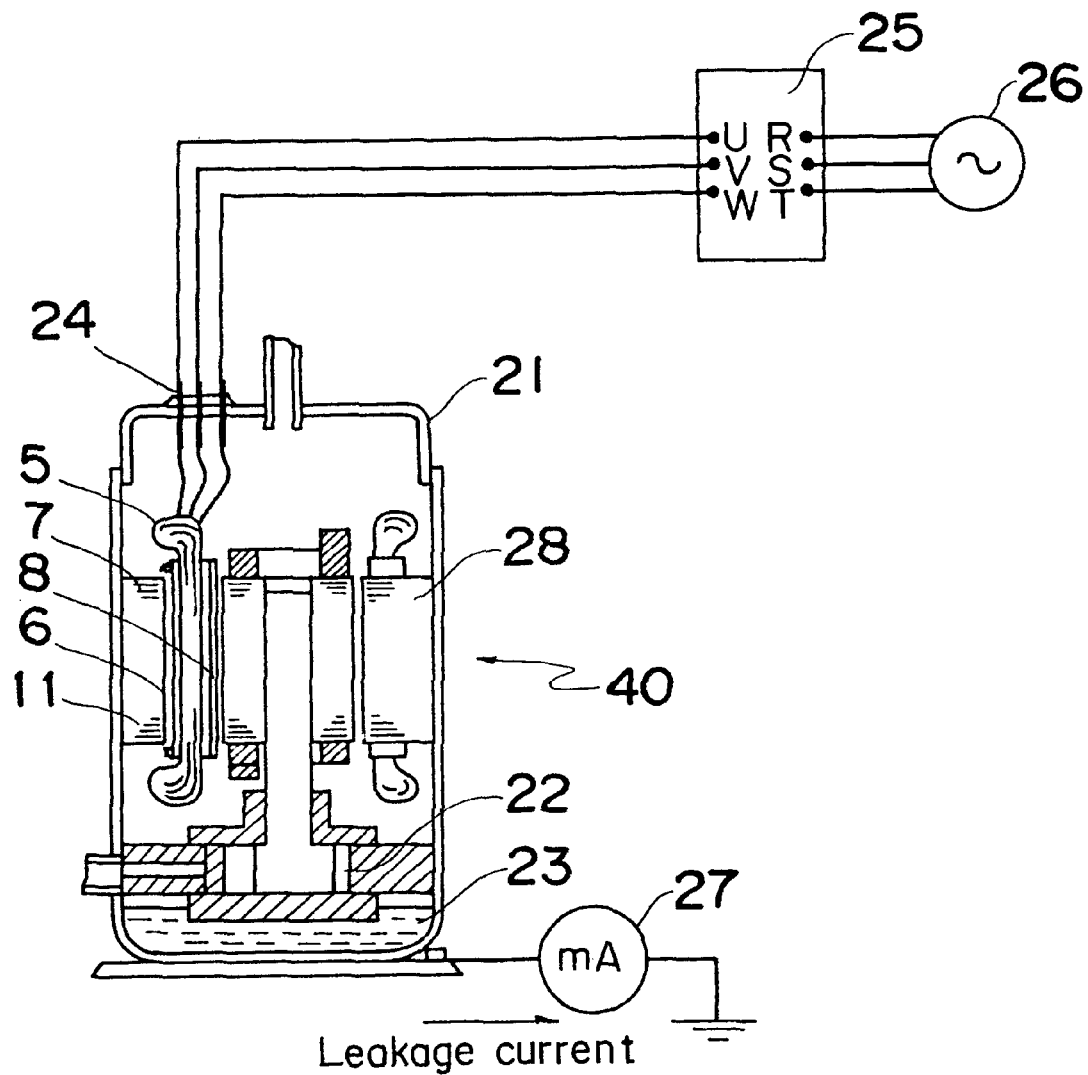
FIG. 9 is a schematic sectional view showing a method of measuring leakage current of a prior art inverter-driven motor including the insulating film of FIG. 8.

FIGS. 6 and 7 show an insulating film 72 of an inverter-driven motor K2 according to a second embodiment of the present invention. The inverter-driven motor K2 may be applied to the electric compressor 50 in the same manner as the inverter-driven motor K1. The insulating film 72 includes an insulating film 72b having a plurality of the bores 12 and a pair of insulating films 72a having no bore 12. The insulating films 72a cover opposite side faces of the insulating film 72b so as to be brought into close contact with the opposite side faces of the insulating film 72b, respectively such that the insulating films 72a and 72b are integrally formed into the insulating member 72. Since other constructions of the inverter-driven motor K2 are similar to those of the inverter-driven motor K1, the description is abbreviated for the sake of brevity.

In case the freezed machine oil of the mixed liquid 23 of the electric compressor 50 is disposed in the vicinity of the inverter-driven motor K2, the insulating film 72 is immersed in the freezed machine oil. Thus, if the insulating films 72a are not brought into contact with the opposite side faces of the insulating film 72b, the freezed machine oil having a relative dielectric constant of about 3 will penetrate into the bores 12 of the insulating film 72b, so that the effects of the present invention will not be realized.

However, in the inverter-driven motor K2, since the insulating films 72a, having no bores 12, are brought into close contact with the opposite side faces of the insulating film 72a having a plurality of the bores 12, such a phenomenon does not happen that the freezed machine oil used in the electric compressor 50 penetrates into the bores 12 of the insulating film 72b, so that capacitance of the insulating film 72 is reduced and thus, quantity of leakage current of the inverter-driven motor K2 can be reduced without a drop in the efficiency of the inverter-driven motor K2.

As is clear from the foregoing description, the following effects can be achieved in the present invention. Namely, since capacitance of the insulating film is lessened, quantity of electric current can be lessened without increasing thickness of the insulating film or reducing the diameter of the winding wire of the inverter-driven motor as in the prior art and thus, quantity of leakage current of the inverter-driven motor can be lessened without a drop in the efficiency of the inverter-driven motor.

What is claimed is:

1. In an inverter-driven motor which is driven by an inverter power source and includes an insulating member for insulating a winding wire and an iron core of the inverter-driven motor from each other at a groove formed at an inner peripheral surface of the iron core, the improvement comprising:

the insulating member being formed by not less than two insulating films;

wherein at least one of the insulating films is formed with a plurality of bores, and each of the bores is defined by an air layer.

2. An inverter-driven motor as claimed in claim 1, wherein at least one of the insulating films comprises a solid film which does not have any bores formed therein.

3. In an inverter-driven motor which is driven by an inverter power source and is built in a vessel of an electric compressor and includes an insulating member for insulating a winding wire and an iron core of the inverter-driven motor at a groove, the improvement comprising:

the insulating member being formed by not less than three insulating films;

wherein at least one of the insulating films is formed with a plurality of bores;

wherein two of the remaining ones of the insulating films are not formed with a bore and are provided on opposite side faces of the at least one of the insulating films, respectively.

4. An inverter-driven motor which can be driven by an inverter power source, said inverter-driven motor comprising:

a stator having an inner peripheral surface and a plurality of axially extending grooves formed the inner peripheral surface;

an insulating member fitted into each of the grooves, the insulating member comprising at least two insulating films, and at least one of the insulating films is formed with a plurality of open through holes in order to reduce the capacitance of the insulating member; and a winding wire provided on the insulating film at each of the grooves.

* * * * *

UNITED STATES PATENT AND TRADEMARK OFFICE
CERTIFICATE OF CORRECTION

PATENT NO. : 5,952,761
DATED : September 14, 1999
INVENTOR(S) : Hiroshi ITOH et al.

It is certified that error appears in the above-identified patent and that said Letters Patent is hereby corrected as shown below:

Title page, item [56] References Cited add the following:

```
--4,788,761    12/6/88    Crawford et al. .............29/596
  4,533,580    8/6/85     Otty .......................428/36--
```

Signed and Sealed this

Seventh Day of March, 2000

Attest:

Attesting Officer

Q. TODD DICKINSON

Commissioner of Patents and Trademarks